(12) United States Patent
Bai et al.

(10) Patent No.: US 10,644,272 B2
(45) Date of Patent: May 5, 2020

(54) CAP ASSEMBLY AND SECONDARY BATTERY

(71) Applicant: Contemporary Amperex Technology Co., Limited, Ningde, Fujian (CN)

(72) Inventors: Lulu Bai, Ningde (CN); Yulian Zheng, Ningde (CN); Peng Wang, Ningde (CN); Zhijun Guo, Ningde (CN); Chengyou Xing, Ningde (CN); Jianxiong Yang, Ningde (CN); Qichang Cai, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 76 days.

(21) Appl. No.: 16/171,341

(22) Filed: Oct. 25, 2018

(65) Prior Publication Data

US 2019/0386263 A1 Dec. 19, 2019

(30) Foreign Application Priority Data

Jun. 14, 2018 (CN) .......................... 2018 1 0613101

(51) Int. Cl.
*H01M 2/04* (2006.01)
*H01M 2/06* (2006.01)
(Continued)

(52) U.S. Cl.
CPC ............... *H01M 2/04* (2013.01); *H01M 2/06* (2013.01); *H01M 2/30* (2013.01); *H01M 10/049* (2013.01)

(58) Field of Classification Search
CPC ............ H01M 2/04; H01M 2/06; H01M 2/30; H01M 10/049; H01M 2/20; H01M 2/26
See application file for complete search history.

(56) References Cited

U.S. PATENT DOCUMENTS

2016/0181578 A1 6/2016 Masuda
2017/0040579 A1* 2/2017 Guen ...................... H01M 2/06
(Continued)

FOREIGN PATENT DOCUMENTS

CN 207233789 U 4/2018
CN 207233790 U 4/2018
(Continued)

OTHER PUBLICATIONS

The extended European search report dated Dec. 21, 2018 for European Application No. 18196385.1, 7 pages
(Continued)

*Primary Examiner* — Stewart A Fraser
(74) *Attorney, Agent, or Firm* — Law Offices of Liaoteng Wang

(57) ABSTRACT

The disclosure relates to a cap assembly and a secondary battery. The cap assembly comprises: a cap plate having an electrode lead-out hole; an electrode terminal including a terminal plate which is located at a side of the cap plate and covers the electrode lead-out hole, and an outer peripheral surface of the terminal panel protrudes from an inner wall of the electrode lead-out hole; a first fixing member at least partly surrounding the terminal plate to fix the electrode terminal to the first fixing member; and a second fixing member connected with the cap plate and including a main portion, the second fixing member being separated from the electrode terminal by the first fixing member. One of the first fixing member and the main portion is provided with an engaging hole and the other is provided with an inserting portion to be inserted into the engaging hole.

13 Claims, 7 Drawing Sheets

(51) Int. Cl.
*H01M 2/30* (2006.01)
*H01M 10/04* (2006.01)

(56) References Cited

U.S. PATENT DOCUMENTS

| | | | |
|---|---|---|---|
| 2018/0083302 A1* | 3/2018 | Koo | H01M 2/26 |
| 2019/0067651 A1* | 2/2019 | Li | H01M 2/0456 |
| 2019/0067663 A1* | 2/2019 | Li | H01M 2/06 |

FOREIGN PATENT DOCUMENTS

| | | | |
|---|---|---|---|
| EP | 3128571 A1 | 2/2017 | |
| EP | 3537498 A1 | 9/2019 | |

OTHER PUBLICATIONS

The second examination report dated Jan. 3, 2020 for European Application No. 18196385.1, 4 pages.

* cited by examiner

CAP ASSEMBLY AND SECONDARY BATTERY

CROSS-REFERENCE TO RELATED APPLICATIONS

The application claims priority to the Chinese Patent Application No. 201810613101.4, filed Jun. 14, 2018, the disclosure of which is incorporated herein by reference in its entirety.

TECHNICAL FIELD

The present disclosure relates to a technical field of a battery, and particularly to a cap assembly and a secondary battery.

BACKGROUND

New energy vehicles are widely promoted in China and the world, but there are still many improvements that need to be made to completely replace fuel vehicles. For example, problems that a mileage of a car is small, a cost of a battery pack is high, and a reliability of the battery pack is low and the like need to be further solved. Based on the above problems, higher requirements are imposed on a secondary battery, i.e., the core part, of an electric vehicle, for example, the secondary battery is required to achieve higher energy density, lower cost, and the like.

At present, the secondary battery generally adopts a square hard housing structure, and the secondary battery housing includes a casing and a cap assembly, and the secondary battery housing provides a sealed space for accommodating an electrode assembly and electrolyte. The electric energy of the electrode assembly is introduced from the sealed space to the outside of the sealed space through an electrode terminal of the cap assembly. In the existing cap assembly, the cap plate is a metal plate and is provided with a through hole, the electrode terminal is divided into a base portion and an extension portion, and a cross-sectional area of the base portion is larger than a diameter of the through hole. During assembly, the base portion is located below the cap plate (i.e., inside the casing), and the extension portion is fixed by a circlip or by riveting after the extension portion passing through the through hole. In this way, the electrode terminal is fixed to the cap plate. Since the base portion is located inside the casing, a space utilization inside the casing is low, thereby reducing an energy density of the secondary battery.

Due to the structure of the electrode terminal itself and the complicated assembly process, not only the assembly efficiency of the secondary battery is affected, but after the electrode terminal is fixed on the cap plate, the electrode terminal and the cap plate are often disconnected due to insufficient fixing force, thereby reducing reliability of use of the secondary battery.

SUMMARY

Embodiments of the present disclosure provide a cap assembly and a secondary battery. A terminal plate included in the cap assembly is firmly fixed to the cap plate by a first fixing member and a second fixing member to prevent separation between the terminal plate and the cap plate, thereby improving safety of structure of the secondary battery.

In an aspect, an embodiment of the present disclosure provides a cap assembly for a secondary battery, comprising: a cap plate having an electrode lead-out hole; an electrode terminal including a terminal plate which is located at a side of the cap plate and covers the electrode lead-out hole, and an outer peripheral surface of the terminal plate protruding from an inner wall of the electrode lead-out hole; a first fixing member at least partly surrounding the terminal plate to fix the electrode terminal to the first fixing member; and a second fixing member connected with the cap plate and including a main portion, the second fixing member being separated from the electrode terminal by the first fixing member; wherein one of the first fixing member and the main portion is provided with an engaging hole and the other is provided with an inserting portion to be inserted into the engaging hole.

According to an aspect of an embodiment of the present disclosure, the engaging hole is provided in the main portion, and the inserting portion is provided in the first fixing member.

According to an aspect of an embodiment of the present disclosure, the main portion includes an inner side face facing the terminal plate and an outer side face opposed to the inner side face, and the engaging hole is a through hole through the outer side face and the inner side face.

According to an aspect of an embodiment of the present disclosure, a diameter of the engaging hole decreases gradually in a direction from the outer side face to the inner side face.

According to an aspect of an embodiment of the present disclosure, the first fixing member includes a first separating portion and a second separating portion, the first separating portion is located between the terminal plate and the second fixing member, the second separating portion is located at a side of the second fixing member away from the terminal plate, and the inserting portion is connected between the first separating portion and the second separating portion.

According to an aspect of an embodiment of the present disclosure, the main portion includes a cylindrical base portion, and the engaging hole is provided at the base portion.

According to an aspect of an embodiment of the present disclosure, the main portion further includes a first flange extending from the base portion and at a predetermined angle to the base portion.

According to an aspect of an embodiment of the present disclosure, the first flange extends in a direction towards the terminal plate, and the terminal plate has a second flange extending towards the main portion, wherein the first flange is located at a side of the second flange away from the cap plate, and a projection of the first flange and a projection of the second flange at least partly overlap with each other in an axial direction of the electrode lead-out hole.

According to an aspect of an embodiment of the present disclosure, the main portion has a rectangular shape, and a shape of a portion of the terminal plate surrounded by the main portion conforms to the shape of the main portion.

According to an aspect of an embodiment of the present disclosure, the second fixing member further includes an annular third flange connected to the main portion and extending in a direction away from the terminal plate, and the third flange is welded to the cap plate.

The cap assembly and the electrode terminal included in the secondary battery of the embodiment of the present disclosure are connected to each other by the first fixing member and the second fixing member. The first fixing member and the terminal plate of the electrode terminal are engaged. The second fixing member is simultaneously engaged with the cap plate and the first fixing member, thereby fixing the first fixing member and the terminal plate to the cap plate through the second fixing member. The first fixing member and the second fixing member are connected and fixed to each other by the inserting portion being inserted into the engaging hole. Since a position of the inserting portion is limited after the inserting portion is inserted into the engaging hole, it is not easy for the inserting portion to be released from the engaging hole when the inserting portion is subjected to an external force, and it is also difficult for the inserting portion to move relative to the engaging hole in a radial direction of the engaging hole. Therefore, the first fixing member and the second fixing member are connected and fixed by means of embedding, so that separation from each other is not easy, and relative positions thereof are not easily changed when subjected to an external force. In this way, stability of connection between the first fixing member and the second fixing member is effectively improved, thereby effectively preventing the first fixing member and the terminal plate from falling off or separating from the cap plate to cause a leakage of the secondary battery and thereby improving reliability and safety of the secondary battery. In addition, since a fixing structure of the electrode terminal located within the casing can be omitted, a space occupation inside the secondary battery can be reduced, thereby increasing an energy density of the secondary battery.

In another aspect, an embodiment of the present disclosure provides a secondary battery, comprising: a casing having an opening; an electrode assembly housed within the casing; and the above cap assembly covering the opening to enclose the electrode assembly within the casing.

BRIEF DESCRIPTION OF THE DRAWINGS

Below, features, advantages, and technical effects of an exemplary embodiment of the present disclosure will be described with reference to the drawings.

Figure 1:
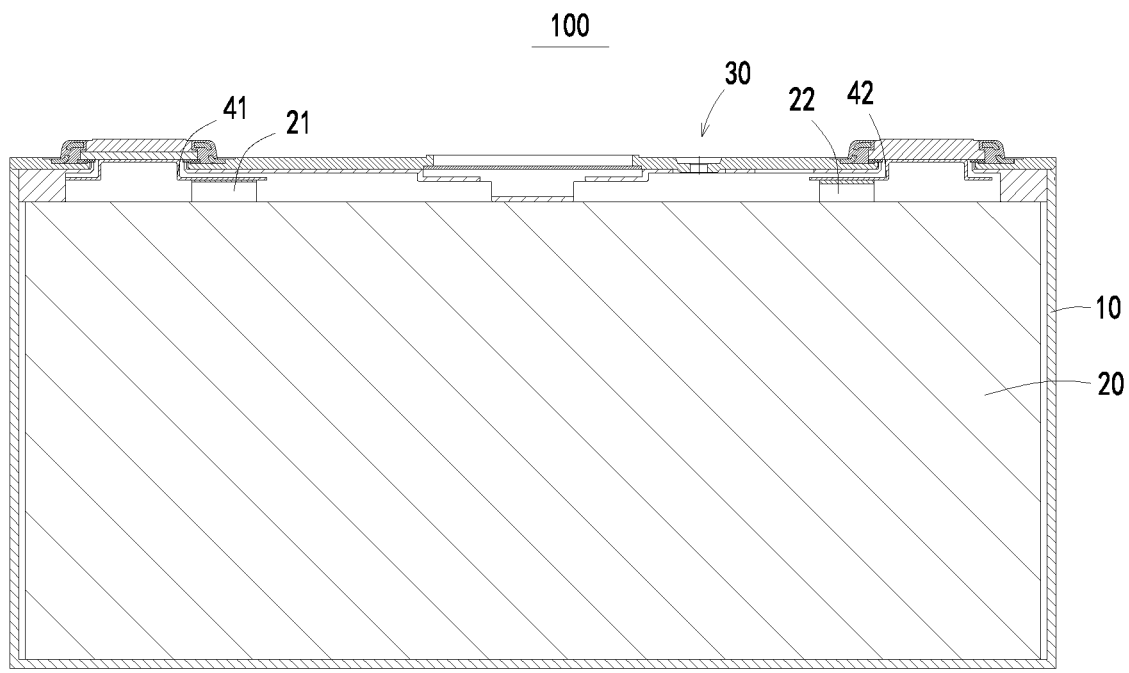
FIG. 1 is a schematic cross-sectional structural view of a secondary battery according to an embodiment of the present disclosure.

In the drawings, the drawings are not drawn to scale.

DESCRIPTION OF REFERENCE SIGNS

100—Secondary battery;
10—Casing;
20—Electrode assembly; 21—Positive tab; 22—Negative tab;
30—Cap assembly;
31—Cap plate; 311—Electrode lead—out hole;
32—Terminal plate; 321—Second flange;
33—First fixing member; 331—Inserting portion; 332—First separating portion; 333—Second separating portion;
34—Second fixing member; 341—Main portion; 341a—Base portion; 341b—First flange; 342—Engaging hole; 343—Third flange;
35—Seal.

DETAILED DESCRIPTION

Below, embodiments of the present disclosure will be further described in detail with reference to the drawings and embodiments. The detailed description of the embodiments and the accompanying drawings are intended to illustrate the principles of the present disclosure and are not intended to limit the scope of the present disclosure.

In the description of the present disclosure, it should be noted that, unless otherwise stated, the meaning of "a plurality" is two or more; the orientation or positional relationship indicated by the terms "upper", "lower", "left", "right", "inside", "outside" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", and the like are used for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by those skilled in the art according to actual circumstance.

In order to better understand the present disclosure, a secondary battery 100 and a cap assembly 30 of an embodiment of the present disclosure will be described in detail below with reference to FIGS. 1 to 10.

Figure 2:
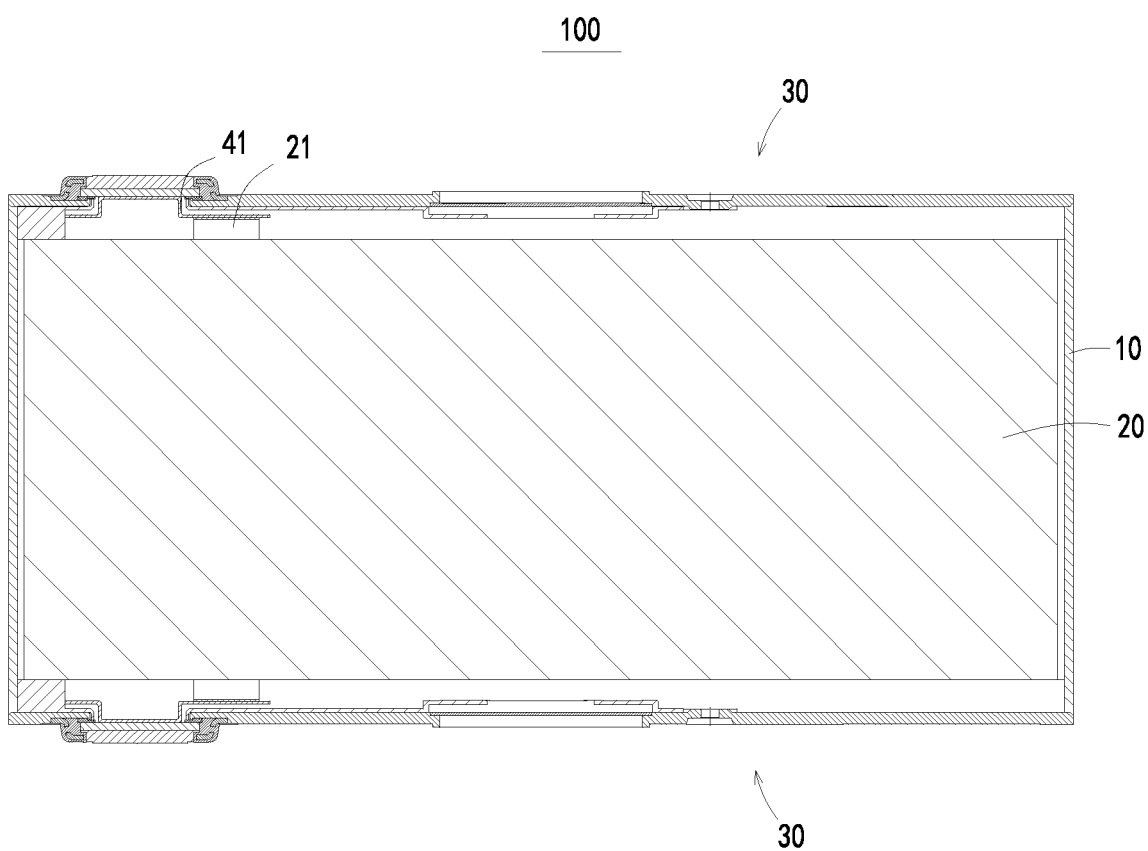
FIG. 2 is a schematic cross-sectional structural view of a secondary battery according to another embodiment of the present disclosure.

Referring to FIG. 1 or FIG. 2, the secondary battery 100 according to an embodiment of the present disclosure includes a casing 10, an electrode assembly 20 disposed within the casing 10, and a cap assembly 30 hermetically connected to the casing 10.

The casing 10 of the present embodiment may have a hexahedral shape or other shapes. The casing 10 has an internal space in which the electrode assembly 20 and electrolyte are accommodated. The casing 10 can be made of a material such as aluminum, aluminum alloy, or plastic.

Referring to FIG. 1, the casing 10 has a cylindrical structure including an opening. The number of the cap assembly 30 is one. A positive output terminal and a negative output terminal are simultaneously disposed on the cap assembly 30. Referring to FIG. 2, the casing 10 has a cylindrical structure including two oppositely disposed openings. The number of the cap assembly 30 is two. Two cap assemblies 30 cover the two openings. One cap assembly 30 is provided with the positive output terminal, and the other cap assembly 30 is provided with the negative output terminal.

The electrode assembly 20 of the present embodiment can form a main body by spirally winding a first electrode plate, a second electrode plate, and a separator together around a winding axis, wherein the separator is an insulator between the first electrode plate and the second electrode plate. The electrode assembly 20 of the present embodiment has a flat structure as a whole, and has a predetermined thickness, height, and width. The axial direction of the electrode assembly 20 is the height direction. In the present embodiment, the first electrode plate is exemplified as a positive electrode plate, and the second electrode plate is a negative electrode plate. Similarly, in other embodiments, the first electrode plate may also be the negative electrode plate, and the second electrode plate is the positive electrode plate. Further, a positive electrode plate active material is coated on a coated area of the positive electrode plate, and a negative electrode plate active material is coated on a coated area of the negative electrode plate. An uncoated area extending from the coated portion of the main body acts as a tab. The electrode assembly 20 includes two tabs, a positive tab 21 and a negative tab 22, the positive tab 21 extends from the coated area of the electrode plate, and the negative tab 22 extends from the coated area of the electrode plate.

Figure 3:
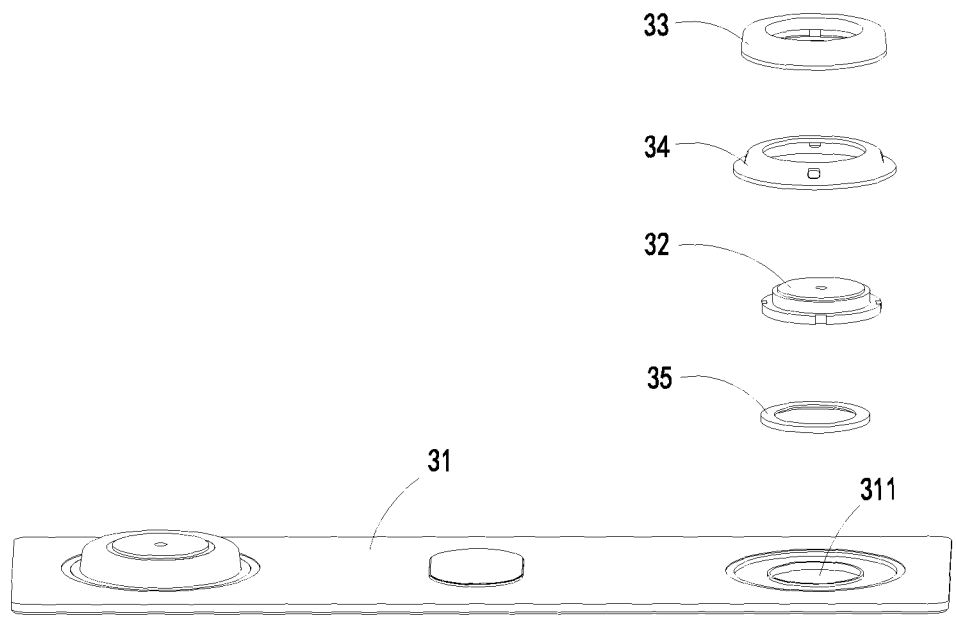
FIG. 3 is a schematic exploded view of a cap assembly according to an embodiment of the present disclosure.
Figure 4:
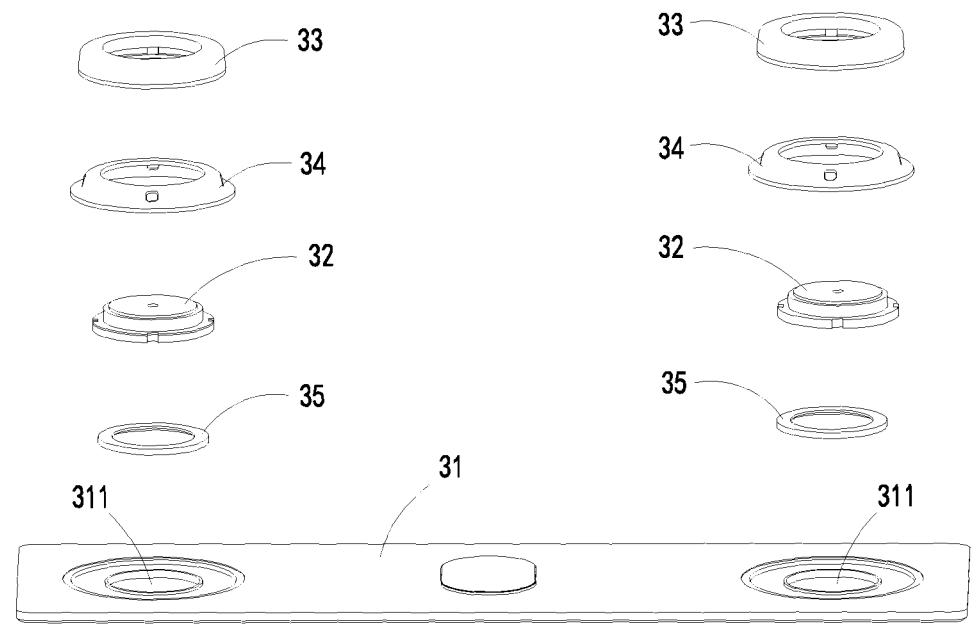
FIG. 4 is a schematic exploded view of a cap assembly according to another embodiment of the present disclosure.
Figure 5:
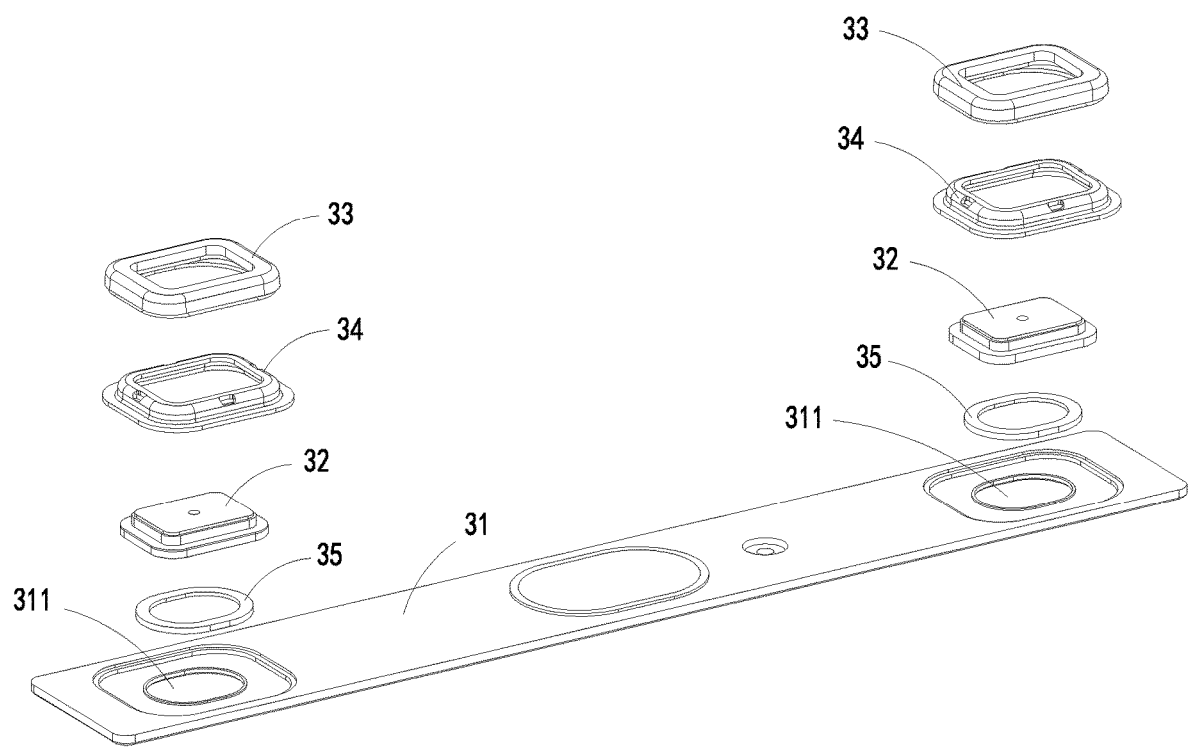
FIG. 5 is a schematic exploded view of a cap assembly according to another embodiment of the present disclosure.

As shown in FIGS. 3 to 5, the cap assembly 30 of the embodiment of the present disclosure includes a cap plate 31, an electrode terminal, a first fixing member 33, and a second fixing member 34. The electrode terminal is connected and fixed to the cap plate 31 via the first fixing member 33 and the second fixing member 34. The cap plate 31 of the present embodiment is hermetically connected to the casing 10 to enclose the electrode assembly 20 within the casing 10. The cap plate 31 has an electrode lead-out hole 311. The electrode terminal includes a terminal plate 32 that is provided corresponding to the electrode lead-out hole 311 and that is connected to the cap plate 31. The terminal plate 32 is located at a side of the cap plate 31 and covers the electrode lead-out hole 311, and an outer peripheral surface of the terminal plate 32 protrudes from an inner wall of the electrode lead-out hole 311. The first fixing member 33 at least partially surrounds the terminal plate 32 to fix the electrode terminal to the first fixing member 33. The second fixing member 34 is connected to the cap plate 31 and includes a main portion 341. The second fixing member 34 is separated from the electrode terminal by the first fixing member 33. One of the first fixing member 33 and the main portion 341 is provided with an engaging hole 342, and the other is provided with an inserting portion 331 to be inserted into the engaging hole 342. The top surface of the terminal plate 32 facing away from the cap plate 31 protrudes from the first fixing member 33 and is higher than the top surface of the first fixing member 33 facing away from the cap plate 31, so that the top surface of the terminal plate 32 can successfully connected to a bus-bar. The electrode terminal may be a positive terminal or a negative terminal. The positive tab 21 is connected to the positive terminal through a positive connecting sheet 41, and the negative tab 22 is connected to the negative terminal through a negative connecting sheet 42.

The cap assembly 30 and the electrode terminal included in the secondary battery 100 of the embodiment of the present disclosure are connected to each other by the first fixing member 33 and the second fixing member 34. The first fixing member 33 is engaged with the terminal plate 32 of the electrode terminal. The second fixing member 34 is simultaneously engaged with the cap plate 31 and the first fixing member 33 to fix the first fixing member 33 and the terminal plate 32 to the cap plate 31 via the second fixing member 34. The second fixing member 34 provides an effective fastening force to the first fixing member 33 and the terminal plate 32.

The first fixing member 33 and the second fixing member 34 are connected and fixed to each other by the inserting portion 331 being inserted into the engaging hole 342. Since a position of the inserting portion 331 is limited after being inserted into the engaging hole 342, it is not easy to be released from the engaging hole 342 when the inserting portion 331 is subjected to an external force, and is also difficult to move relative to the engaging hole 342 in a radial direction of the engaging hole 342. Therefore, the first fixing member 33 and the second fixing member 34 are connected and fixed by means of embedding, so that relative positions thereof are not easily changed when subjected to an external force. In this way, a connection stability between the first fixing member 33 and the second fixing member 34 is effectively improved and separation from each other is not easy, thereby effectively preventing the first fixing member 33 and the terminal plate 32 from separating from the cap plate 31 to cause a leakage of the secondary battery 100, thereby improving reliability and safety of the secondary battery 100.

In addition, as the terminal plate 32 is connected and fixed to the cap plate 31 from the outside of the cap plate 31 by the first fixing member 33 and the second fixing member 34, a fixing structure in which the electrode terminal is located within the casing 10 can be omitted, and a space occupation inside the secondary battery 100 can be reduced and thereby increasing an energy density of the secondary battery 100.

The technical solution of the cap assembly 30 is further described below by way of specific embodiments, but the following embodiments do not limit the scope of protection of the claims of the present disclosure.

First Embodiment

In order to better understand the present disclosure, the secondary battery 100 and the cap assembly 30 of the embodiment of the present disclosure will be described in detail below with reference to FIGS. 3 to 9.

Figure 6:
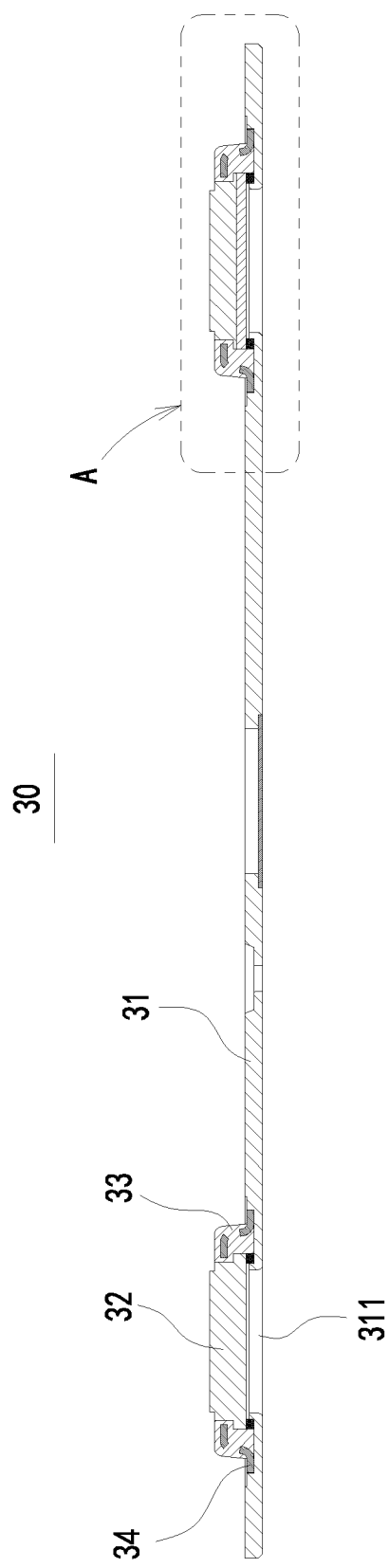
FIG. 6 is a schematic cross-sectional structural view of a cap assembly according to an embodiment of the present disclosure.
Figure 7:
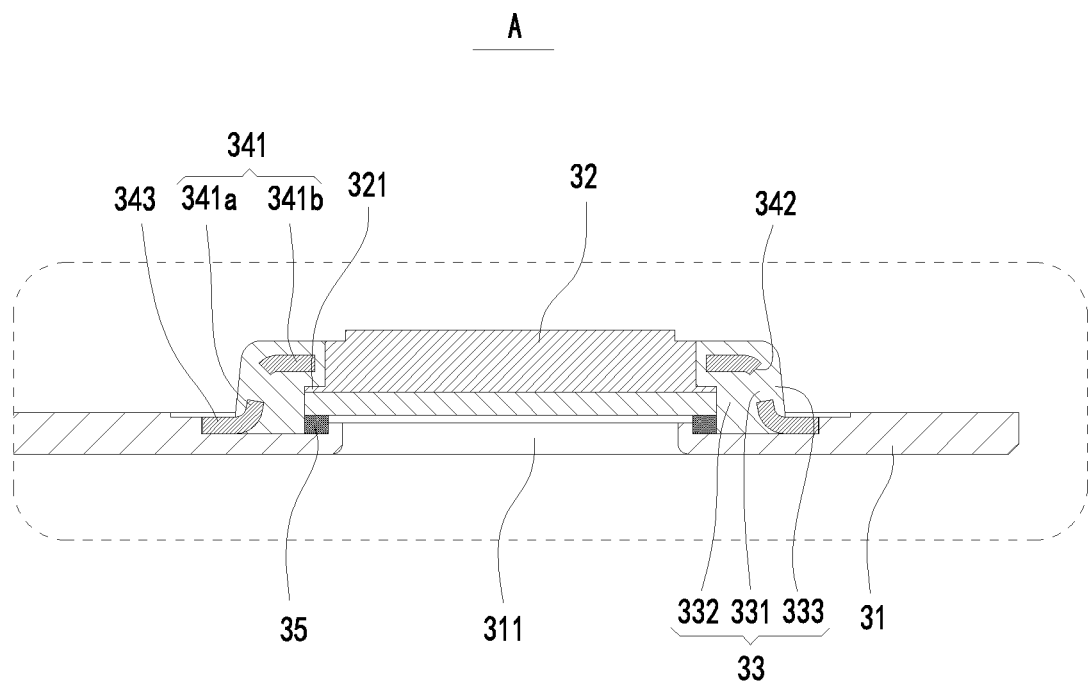
FIG. 7 is a partial enlarged view of a portion A in FIG. 6.

As shown in FIG. 6 and FIG. 7, the first fixing member 33 of the embodiment is provided with the inserting portion 331, and the main portion 341 of the second fixing member 34 is provided with the engaging hole 342. A portion of the first fixing member 33 is located in the engaging hole 342 to form the inserting portion 331. The inserting portion 331 of the first fixing member 33 and the engaging hole 342 of the second fixing member 34 are connected with each other by means of embedding, thereby effectively increasing a connection strength between the first fixing member 33 and the second fixing member 34. The connection between the fixing member 33 and the second fixing member 34 is less likely to be separated or loosened, and a connection stability between the terminal plate 32 and the cap plate 31 is further ensured.

In one embodiment, the terminal plate 32 included in the electrode terminal has a sheet-like or plate-like structure. A shape of a portion of the terminal plate 32 surrounded by the first fixing member 33 conforms to a shape of the first fixing member 33. The first fixing member 33 has an annular structure and has an accommodation space adapted to the shape of the terminal plate 32, so that the terminal plate 32 can be accommodated in the accommodation space such that the outer peripheral surface of the terminal plate 32 is at least partially surrounded by the first fixing member 33 and the terminal plate 32 is fixed to the first fixing member 33. It should be noted that the fixing here refers to the fixing in a thickness direction of the cap plate 31. Since a lower portion of the terminal plate 32 is fixed and limited by the cap 3, if the terminal plate 32 is not allowed to be removed from a top portion of the cap plate 31, the fixing can be achieved.

In one example, referring to FIG. 3 or FIG. 4, the terminal plate 32 included in the electrode terminal may have a cylindrical structure. The main portion 341 of the second fixing member 34 and the first fixing member 33 are both revolving bodies, and have an accommodation space which is a circular hole, so that a part of the terminal plate 32 is inserted into and contacts with the accommodation space. In another example, referring to FIG. 5, the terminal plate 32 included in the electrode terminal may have a quadrangular prism structure. The main portion 341 of the second fixing member 34 and the first fixing member 33 have a rectangular structure and have an accommodation space which is a square hole. Thus, the terminal plate 32 is restrained by the main portion 341 from rotating, and a possibility that the terminal plate 32 and the first fixing member 33, the terminal plate 32 and the cap plate 31 are separated due to the rotation of the terminal plate 32 is reduced. A connection stability between the terminal block 32 and the first fixing member 33, the terminal plate 32, and the cap plate 31 is improved.

A connecting manner between the terminal plate 32, the first fixing member 33 and the second fixing member 34 is not limited in the embodiment of the present disclosure. In one embodiment, the first fixing member 33 is bonded to the outer peripheral surface of the terminal block 32 by integral injection molding. The first fixing member 33 is made of a plastic material, and the terminal plate 32, the second fixing member 34, and the cap plate 31 are made of a metal material. The terminal plate 32 and the second fixing member 34 are engaged together by injection molding, and a plastic solidified portion of the plastic after injection molding forms the first fixing member 33. During the injection molding process, a portion of the plastic fills the engaging hole 342 provided in the main portion 341 of the second fixing member 34. The plastic that enters the engaging hole 342 forms an inserting portion 331 after solidification. Thus, both the first fixing member 33 and the second fixing member 34 are integrally formed, and the first fixing member 33 and the second fixing member 34 have high connection strength and good connection stability. Preferably, the terminal plate 32, the first fixing member 33, and the second fixing member 34 may be integrally formed, thereby further increasing the connection stability between the terminal plate 32 and the first fixing member 33. At the same time, the second fixing member 34 and the cap plate 31 can be fixed by welding, thereby improving an engaging strength and engaging reliability thereof.

In one example, the first fixing member 33 is a rigid plastic member (for example, made of one or more of polyphenylene sulfide, perfluoroalkoxy resin or polypropylene), so that the first fixing member 33 can be made of high temperature resistant insulating plastic material by means of integral injection molding, which has high rigidity and is not easy to be deformed. In another example, when the first fixing member 33 is used for fixing the positively-charged terminal plate 32, conductive plastic (for example, conductive carbon is added to the insulating plastic material) can be used in preparing the first fixing member 33. Therefore the casing 10 is also positively charged to prevent the casing 10 from being corroded by the electrolyte.

Figure 10:
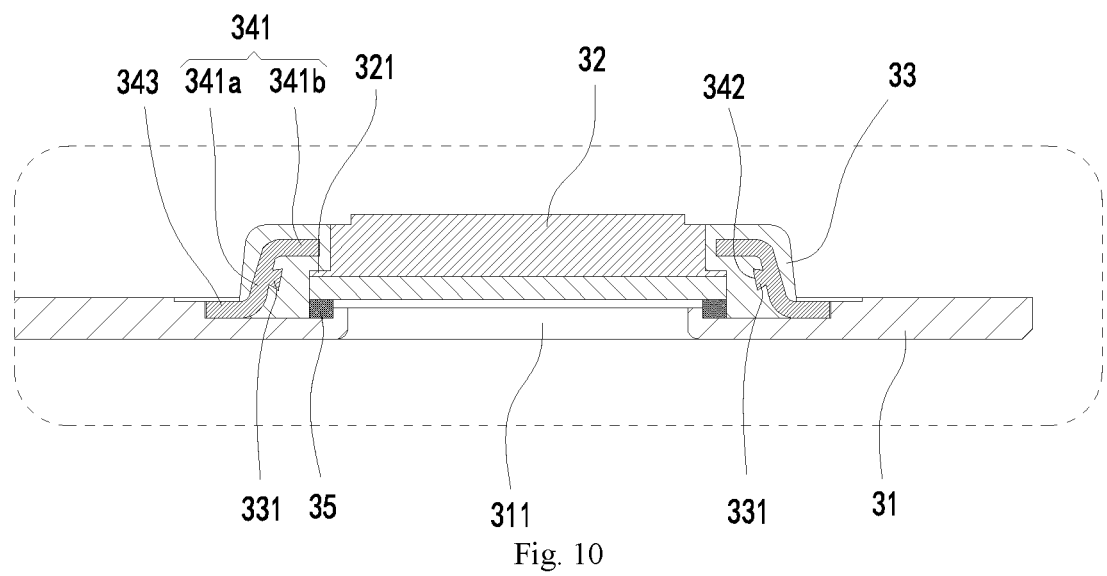
FIG. 10 is a schematic partial cross-sectional structural view of a cap assembly according to an embodiment of the present disclosure.

Referring to FIGS. 7 and 10, the electrode terminals of the present embodiment are composed only of the terminal plate 32, that is, the electrode terminals are all located at a side of the cap plate 31. In one example, the terminal plate 32 may be made of a copper alloy or an aluminum alloy, or may be formed of a copper-aluminum composite plate (for example, an upper layer is an aluminum plate and a lower layer is a copper plate).

Figure 9:
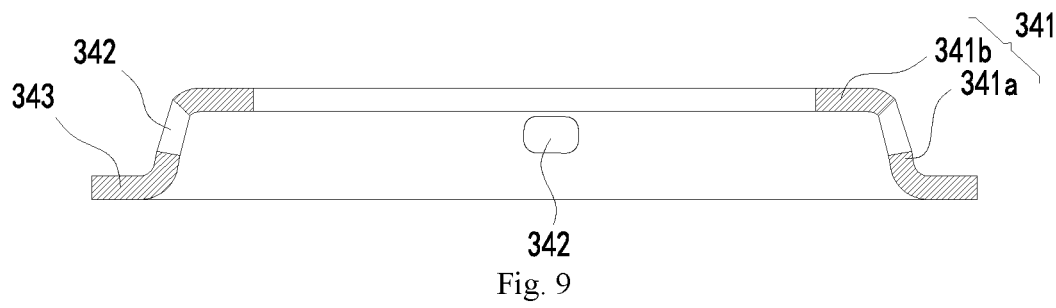
FIG. 9 is a schematic cross-sectional structural view of a second fixing member according to an embodiment of the present disclosure.

Referring to FIGS. 7 and 9, the main portion 341 of the present embodiment has the above-described accommodation space for accommodating the terminal plate 32. The main portion 341 includes an inner side face facing the terminal plate 32 and an outer side face opposite to the inner side face. The engaging hole 342 may be a blind hole extending from the outer side face toward the inner side face or extending from the inner side face toward the outer side face, or may be a through hole through the outer side face and the inner side face. Preferably, the engaging hole 342 is a through hole. The inner side face of the main portion 341 and the outer peripheral surface of the terminal plate 32 are spaced apart by a predetermined distance. When the first fixing member 33 is manufactured by injection molding, a part of the first fixing member 33 is filled in a gap between the inner side face of the main portion 341 and the outer peripheral surface of the terminal plate 32 to separate the main portion 341 from the terminal plate 32. A portion of the first fixing member 33 is filled in the engaging hole 342 to form the inserting portion 331 such that the first fixing member 33 and the second fixing member 34 are engaged with each other, thereby improving a connection strength between them.

In one example, the engaging hole 342 provided in the main portion 341 is a through hole. The first fixing member 33 includes a first separating portion 332 and a second separating portion 333 that are connected with each other. The first separating portion 332 is located between the main portion 341 included in the second fixing member 34 and the terminal plate 32 to separate the main portion 341 from the terminal plate 32. The second separating portion 333 is located at a side of the main portion 341 included in the second fixing member 34 away from the terminal plate 32. The inserting portion 331 is connected between the first separating portion 332 and the second separating portion 333. Thus, on the one hand, a portion of the main portion 341 is completely wrapped by the first separating portion 332, the second separating portion 333, and the inserting portion 331, so that the first fixing member 33 and the second fixing member 34 form an integral structure and a connecting stability between them is good. On the other hand, the inserting portion 331 can tension the first separating portion 332 and the second separating portion 333 such that the first separating portion 332 and the second separating portion 333 are in close contact with the main portion. Therefore, the first separating portion 332 and the second separating portion 333 are not easily displaced in a direction away from the main portion 341 to be disconnected from the main portion 341, and the second separating portion 333 is also prevented from being warped and deformed in a direction away from the main portion 341. A connection stability of the first fixing member 33 and the second fixing member 34 is effectively improved.

In one embodiment, a diameter of the engaging hole 342 decreases gradually from the outer side face to the inner side face to tapered the engaging hole 342. The engaging hole 342 of this embodiment may be a circular hole or a polygonal hole. Thus, when the first fixing member 33 is formed by injection molding, a molten plastic can flow more smoothly in an axial direction of the engaging hole 342 to sufficiently fill the engaging hole 342. Compared to the engaging hole 342 having a structure of a constant diameter hole, the engaging hole 342 of the present embodiment has a structure of a variable diameter hole, and can effectively reduce a possibility that the inserting portion 331 and the engaging hole 342 are not tightly connected with each other due to a void is formed between them when the first fixing member 33 is manufactured by injection molding.

Figure 8:
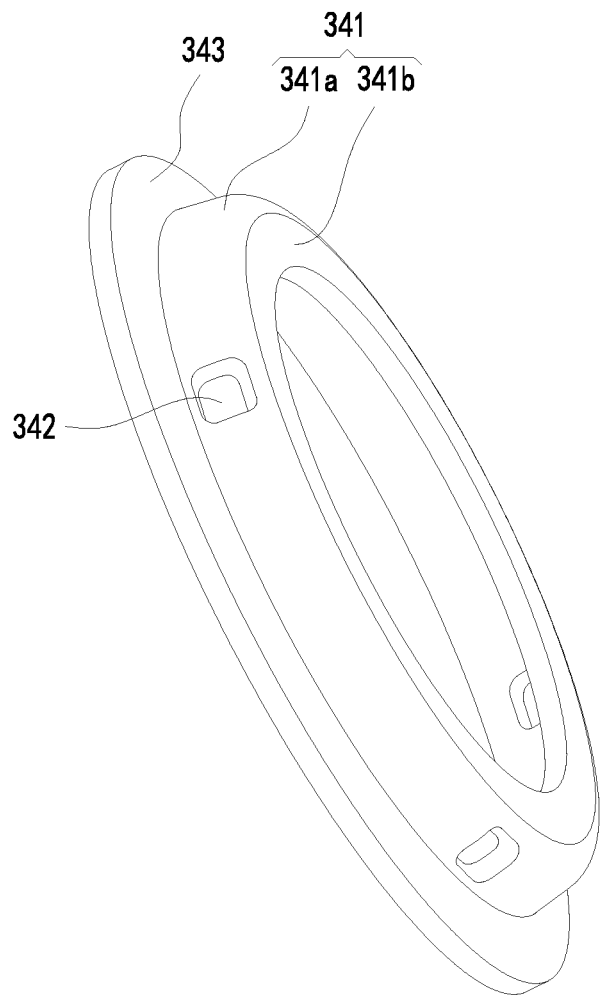
FIG. 8 is a schematic overall structural view of a second fixing member according to an embodiment of the present disclosure.

Referring to FIGS. 8 and 9, the main portion 341 of the present embodiment includes a cylindrical base portion 341a. The engaging hole 342 of this embodiment is provided on the base portion 341a. When an internal pressure of the secondary battery 100 increases, the cap plate 31 is deformed by the internal pressure, and a deform degree of a central portion of the cap plate 31 in a width direction is greater than that of both sides of the cap plate 31 in the width direction. When the cap plate 31 is deformed, the first fixing member 33 is pulled to be deformed at the same time, thereby reducing a sealing property between the terminal plate 32 and the cap plate 31. For example, when the secondary battery 100 is overcharged, it causes an increase in the internal pressure. Since the base portion 341a has a cylindrical structure and the base portion 341a is provided around the terminal plate 32, the first fixing member 33 is restrained by the base portion 341a in its own peripheral direction, thereby reducing the deformation of the first fixing member 33. When the cap plate 31 is deformed, the terminal plate 32 can still be pressed against the cap plate 31, thereby reducing a possibility of cracks between the terminal plate 32 and the cap plate 31 to reduce a possibility of air leakage and liquid leakage between the terminal plate 32 and the cap plate 31.

The body portion 341 of the present embodiment further includes a first flange 341b. The first flange 341b extends from the base portion 341a and is at a predetermined angle with the base portion 341a. In one example, the first flange 341b is completely wrapped by the first fixing member 33, while the base portion 341a is at least partially wrapped by the first fixing member 33 and the engaging hole 342 is completely covered by the first fixing member 33. The main portion 341 included in the second fixing member 34 is less likely to move in the radial direction and/or the axial direction of the electrode lead-out hole 311 with respect to the first fixing member 33 under the restriction of the base portion 341a and the first flange 341b. Thereby, a possibility that the first fixing member 33 or the second fixing member 34 is easily separated by an external force is reduced. Alternatively, the first flange 341b has an annular structure, and the first flange 341b is provided around the cylindrical base portion 341a. Since the first flange 341b is bent at an angle with respect to the base portion 341a, an overall rigidity of the main portion 341 is improved, thereby further increasing a deformation resistance of the first fixing member 33.

In one embodiment, the first flange 341b extends toward the terminal plate 32, and the terminal plate 32 has a second flange 321 extending toward the main portion 341. The first flange 341b is located at a side of the second flange 321 away from the cap plate 31. In the axial direction of the electrode lead-out hole 311, the projection of the first flange 341b at least partially overlaps with the projection of the second flange 321. Thus, after the second fixing member 34 is connected and fixed to the cap plate 31, the first flange 341b included in the second fixing member 34 applies a pressing force along the axial direction of the electrode lead-out hole 311 to the second flange 321 included in the terminal plate 32. Therefore, a possibility that a seal failure at the terminal plate 32 caused by a play of the terminal plate 32 in the axial direction of the electrode lead-out hole 311 is reduced. Therefore, a possibility of liquid leakage of the secondary battery 100 at the terminal plate 32 is reduced. In one example, both the first flange 341b and the second flange 321 may have an annular structure. Since the first flange 341b and the second flange 321 have an annular structure, the pressing force of the first flange 341b against the first fixing member 33 and the second flange 321 can be further increased. The second fixing member 34 of the present embodiment further includes a third flange 343 that is connected to the main portion 341 and extends in a direction away from the terminal plate 32. The second fixing member 34 is welded to the cap plate 31 through the third flange 343 to improve simplicity and convenience of a connection operation and a connection strength between the second fixing member 34 and the cap plate 31. The third flange 343 is away from the main portion 341 and is not wrapped by the first fixing member 33 so that an edge of the third flange 343 is welded to the cap plate 31. In one example, the third flange 343 may have an annular structure, so that the third flange 343 may be connected to the cap plate 31 in its own peripheral direction. Therefore, on the one hand, a deformation resistance of the cap plate 31 is increased, and on the other hand, a connection reliability between the second fixing member 34 and the cap plate 31 is increased. Referring to FIG. 7, in order to seal the electrode lead-out hole 311, a seal 35 is provided between the terminal plate 32 and the cap plate 31. The seal 35 is provided around the electrode lead-out hole 311. In the present embodiment, the seal 35 is a ring body, and an annular groove is provided at a surface of the terminal plate 32 toward the cap plate 31 for accommodating the seal 35. In addition, after the terminal plate 32 is assembled on the cap plate 31, the terminal plate 32 can press the seal 35 toward the cap plate 31 under a pressing force of the second fixing member 34, so that the terminal plate 32 and the cap plate 31 are in a sealed connection state. The seal 35 can improve a sealing property between the terminal plate 32 and the cap plate 31, and avoid a problem of liquid leakage between the terminal plate 32 and the cap plate 31 due to poor sealing, so that a use reliability of the secondary battery 100 can be further improved.

The terminal plate 32, the first fixing member 33 and the second fixing member 34 of the above embodiment can be applied to the positive output end and/or the negative output end of the cap assembly 30, thereby facilitating flexible selection according to product design requirements and improving an adaptability of the cap assembly 30. Referring to FIG. 3, the terminal plate 32, the first fixing member 33, and the second fixing member 34 may be applied to the positive output terminal or the negative output terminal of the cap assembly 30. Referring to FIG. 4 or FIG. 5, the terminal plate 32, the first fixing member 33, and the second fixing member 34 may be applied to the positive output terminal and the negative output terminal of the cap assembly 30.

Second Embodiment

In the first embodiment, the structure of the cap assembly 30 has been described. In the present embodiment, differences from the first embodiment will be mainly described, and the same structure will not be repeatedly described in the embodiment.

As shown in FIG. 10, the first fixing member 33 of the embodiment of the present disclosure is provided with the engaging hole 342, and the main portion 341 of the second fixing member 34 is provided with the inserting portion 331. The engaging hole 342 provided in the first fixing member 33 may be a through hole or a blind hole. Preferably, the engaging hole 342 provided in the first fixing member 33 is a blind hole. A portion of the second fixing member 34 is located within the engaging hole 342 to form the inserting portion 331. A connection strength between the first fixing member 33 and the second fixing member 34 can be effectively increased by means of the inserting portion 331 of the second fixing member 34 being inserted into the engaging hole 342 of the first fixing member 33. Therefore, the fixing member 33 and the second fixing member 34 are less likely to be separated from each other or loosened at the connected position between them, and a connection stability of the terminal plate 32 and the cap plate 31 is further ensured.

In one embodiment, the engaging hole 342 is a blind hole, and its own aperture gradually increases in a depth direction, so that a longitudinal section of the engaging hole 342 is trapezoidal. A shape of the inserting portion 331 conforms to the shape of the engaging hole 342 so that the first fixing member 33 and the second fixing member 34 are firmly and stably connected.

The cap assembly 30 of the secondary battery 100 provided by the embodiment of the present disclosure is used to be connected to an opening of the casing 10 of the secondary battery 100 to seal the electrode assembly 20 and the electrolyte in the casing 10, and an electrical connection between the electrode assembly 20 and conductive components external to the casing 10 is achieved. The cap assembly 30 of the embodiment of the present disclosure make the terminal plate 32 be firmly connected to the cap plate 31 through the first fixing member 33 and the second fixing member 34, thereby ensuring stable and reliable connection state of the terminal plate 32 and the cap plate 31. Therefore, separation between the terminal plate 32 and the cap plate 31 is less likely to occur, and a use reliability of the secondary battery 100 is improved. The cap assembly 30 of the embodiment of the present disclosure has a simplified structure, a low assembly difficulty, and can also improve a sealing effect of the secondary battery 100, thereby reducing a production cost of the secondary battery 100.

An embodiment of the present disclosure also provides a secondary battery 100 including the above embodiment. The secondary battery 100 of the present embodiment has a good overall sealing effect, and is unlikely to leak at the cap assembly 30, thereby improving a reliability and safety during use.

Although the present disclosure has been described with reference to the preferred embodiments thereof, various modifications may be made thereto and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A cap assembly for a secondary battery, comprising:
a cap plate having an electrode lead-out hole;
an electrode terminal including a terminal plate, wherein the terminal plate is located at a side of the cap plate and covers the electrode lead-out hole;
a first fixing member at least partly surrounding the terminal plate to fix the electrode terminal to the first fixing member; and
a second fixing member connected with the cap plate and including a main portion, wherein the second fixing member is separated from the electrode terminal by the first fixing member;
wherein one of the first fixing member and the main portion is provided with an engaging hole and the other is provided with an inserting portion, and the inserting portion is inserted into the engaging hole.

2. The cap assembly of claim 1, wherein the engaging hole is arranged in the main portion, and the inserting portion is arranged in the first fixing member.

3. The cap assembly of claim 2, wherein the main portion includes an inner side face facing the terminal plate and an outer side face opposed to the inner side face, and the engaging hole is a through hole through the outer side face and the inner side face.

4. The cap assembly of claim 3, wherein a diameter of the engaging hole decreases gradually in a direction from the outer side face to the inner side face.

5. The cap assembly of claim 3, wherein the first fixing member includes a first separating portion and a second separating portion, the first separating portion is located between the terminal plate and the second fixing member, the second separating portion is located at a side of the second fixing member away from the terminal plate, and the inserting portion is connected between the first separating portion and the second separating portion.

6. The cap assembly of claim 2, wherein the main portion includes a cylindrical base portion.

7. The cap assembly of claim 6, wherein the engaging hole is provided at the base portion.

8. The cap assembly of claim 6, wherein the main portion further includes a first flange extending from the base portion and at a predetermined angle to the base portion.

9. The cap assembly of claim 8, wherein the first flange extends in a direction towards the terminal plate, and the terminal plate comprises a second flange extending towards the main portion, wherein the first flange is located at a side of the second flange away from the cap plate, and a projection of the first flange and a projection of the second flange at least partly overlap with each other in an axial direction of the electrode lead-out hole.

10. The cap assembly of claim 1, wherein an outer peripheral surface of the terminal panel protrudes from an inner wall of the electrode lead-out hole.

11. The cap assembly of claim 1, wherein the main portion has a rectangular shape, and a shape of a portion of the terminal plate surrounded by the main portion conforms to the shape of the main portion.

12. The cap assembly of claim 1, wherein the second fixing member further includes an annular third flange connected to the main portion and extending in a direction away from the terminal plate, and the third flange is welded to the cap plate.

13. A secondary battery, comprising:
a casing having an opening;
an electrode assembly housed within the casing; and
a cap assembly according to claim 1, the cap assembly covering the opening.

\* \* \* \* \*